US010781962B2

(12) United States Patent
Sarmiento Klapper et al.

(10) Patent No.: US 10,781,962 B2
(45) Date of Patent: Sep. 22, 2020

(54) CORROSION PROTECTION ELEMENT FOR DOWNHOLE CONNECTIONS

(71) Applicants: Helmuth Sarmiento Klapper, Hannover (DE); Andreas Peter, Celle (DE)

(72) Inventors: Helmuth Sarmiento Klapper, Hannover (DE); Andreas Peter, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 328 days.

(21) Appl. No.: 15/680,877

(22) Filed: Aug. 18, 2017

(65) Prior Publication Data

US 2019/0056055 A1    Feb. 21, 2019

(51) Int. Cl.
| *F16L 58/18* | (2006.01) |
| *F16L 15/00* | (2006.01) |
| *E21B 17/042* | (2006.01) |
| *E21B 41/02* | (2006.01) |
| *E21B 33/037* | (2006.01) |

(52) U.S. Cl.
CPC .......... *F16L 58/182* (2013.01); *E21B 17/042* (2013.01); *E21B 33/0375* (2013.01); *E21B 41/02* (2013.01); *F16L 15/00* (2013.01); *F16L 15/001* (2013.01)

(58) Field of Classification Search
CPC .... E21B 33/0375; E21B 41/02; F16L 58/182; F16L 15/00; F16L 15/001; F16L 15/002; F16L 15/006; F16L 15/007
USPC ................................................. 285/333, 334
See application file for complete search history.

(56) References Cited

U.S. PATENT DOCUMENTS

| 1,211,346 | A |   | 1/1917  | Pickering |             |
|-----------|---|---|---------|-----------|-------------|
| 2,571,062 | A |   | 10/1951 | Humble    |             |
| 2,744,880 | A |   | 5/1956  | Brown     |             |
| 2,763,907 | A |   | 9/1956  | Burke     |             |
| 3,307,860 | A | * | 3/1967  | Blount    | F16L 15/003 |
|           |   |   |         |           | 285/55      |
| 3,361,448 | A | * | 1/1968  | Warrington| F16L 15/006 |
|           |   |   |         |           | 285/55      |
| 3,620,555 | A | * | 11/1971 | Hinds     | F16L 15/001 |
|           |   |   |         |           | 285/55      |
| 4,157,732 | A |   | 6/1979  | Fonner et al. |         |

(Continued)

FOREIGN PATENT DOCUMENTS

| CN | 1786278 A   | 6/2006 |
| CN | 103132083 A | 6/2013 |

(Continued)

OTHER PUBLICATIONS

International Search Report and Written Opinion for International Application No. PCT/US2018/047040; International Filing Date Aug. 20, 2018; Report dated Jan. 24, 2019 (pp. 1-14).

*Primary Examiner* — David Bochna
(74) *Attorney, Agent, or Firm* — Cantor Colburn LLP

(57) ABSTRACT

A system for use in corrosive environments includes a first tubular including a first connector portion, and a second tubular including a second connector portion. The first connector portion overlaps the second connector portion to form a connection joint. A magnesium element is arranged between the first connector portion and the second connector portion at the connection joint.

14 Claims, 3 Drawing Sheets

(56) References Cited

U.S. PATENT DOCUMENTS

| | | | | |
|---|---|---|---|---|
| 4,164,257 | A * | 8/1979 | Anthony | E21B 41/02 166/113 |
| 4,379,575 | A * | 4/1983 | Martin | F16L 15/006 285/369 |
| 4,496,013 | A * | 1/1985 | Serpa | E21B 41/02 175/327 |
| 4,496,444 | A | 1/1985 | Bagnulo | |
| 4,600,219 | A * | 7/1986 | Yoshida | F16L 58/182 285/288.5 |
| 4,645,697 | A | 2/1987 | Torigoe | |
| 5,165,478 | A * | 11/1992 | Wilson | E21B 41/02 166/241.1 |
| 5,906,399 | A | 5/1999 | Noel | |
| 6,312,024 | B1 | 11/2001 | Dutilleul et al. | |
| 8,567,494 | B2 * | 10/2013 | Rytlewski | E21B 34/14 166/250.01 |
| 9,027,637 | B2 * | 5/2015 | Kang | E21B 34/063 166/205 |
| 9,045,943 | B2 | 6/2015 | Puzz | |
| 9,187,686 | B2 * | 11/2015 | Crews | E21B 29/00 |
| 9,932,796 | B2 * | 4/2018 | Walton | E21B 34/063 |
| 10,016,810 | B2 * | 7/2018 | Salinas | E21B 33/12 |
| 2007/0029797 | A1 * | 2/2007 | Santi | F16L 15/06 285/333 |
| 2008/0277932 | A1 * | 11/2008 | Grubert | F16B 37/12 285/334 |
| 2010/0264649 | A1 * | 10/2010 | Goto | F16L 15/001 285/333 |
| 2011/0025052 | A1 * | 2/2011 | Goto | F16L 15/006 285/333 |
| 2011/0163538 | A1 | 7/2011 | Goto et al. | |
| 2012/0091396 | A1 * | 4/2012 | Setlur | E21B 41/02 252/387 |
| 2013/0075083 | A1 * | 3/2013 | Gard | F16L 15/001 166/242.6 |
| 2013/0209175 | A1 | 8/2013 | Keyworth | |
| 2013/0288051 | A1 | 10/2013 | Arantes et al. | |
| 2014/0284919 | A1 * | 9/2014 | Goto | F16L 15/004 285/94 |
| 2015/0159282 | A1 | 6/2015 | Goodwin | |
| 2015/0191674 | A1 * | 7/2015 | Goto | E21B 17/042 285/94 |
| 2016/0025257 | A1 | 1/2016 | Birdwell | |
| 2016/0258218 | A1 | 9/2016 | Lange | |
| 2016/0258227 | A1 * | 9/2016 | Vemuri | F16L 15/00 |
| 2018/0283142 | A1 * | 10/2018 | Zhang | E21B 41/02 |

FOREIGN PATENT DOCUMENTS

| | | |
|---|---|---|
| WO | 2009049836 A1 | 4/2009 |
| WO | 2016094244 A1 | 6/2016 |

* cited by examiner

CORROSION PROTECTION ELEMENT FOR DOWNHOLE CONNECTIONS

BACKGROUND

Downhole tools are exposed to harsh environments. For example, downhole tools may be exposed to corrosive fluids that may compromise integrity of materials in downhole components. Corrosive fluids may have a particular impact at downhole connections where material thickness may be less than in other areas of the downhole tool. Localized corrosion and environmentally assisted cracking at downhole connections, may reduce tool reuse and disrupt operations in, for example, a case of complete tool failure. Failures due to corrosion may be very costly and can increase operational costs demonstratively.

SUMMARY

A system for use in corrosive environments includes a first tubular including a first connector portion, and a second tubular including a second connector portion. The first connector portion overlaps the second connector portion to form a connection joint. A magnesium element is arranged between the first connector portion and the second connector portion at the connection joint.

A method of protecting a connection from corrosive fluid includes forming a connection joint between a first connector portion of a first tubular and a second connector portion of a second tubular, positioning a magnesium element at the connection joint, exposing the magnesium element to a corrosive fluid, and forming a selected pH zone at the connection joint by reacting the magnesium element and the corrosive fluid.

BRIEF DESCRIPTION OF THE DRAWINGS

Referring now to the drawings wherein like elements are numbered alike in the several Figures.

DETAILED DESCRIPTION

A detailed description of one or more embodiments of the disclosed apparatus and method are presented herein by way of exemplification and not limitation with reference to the Figures.

Figure 1:
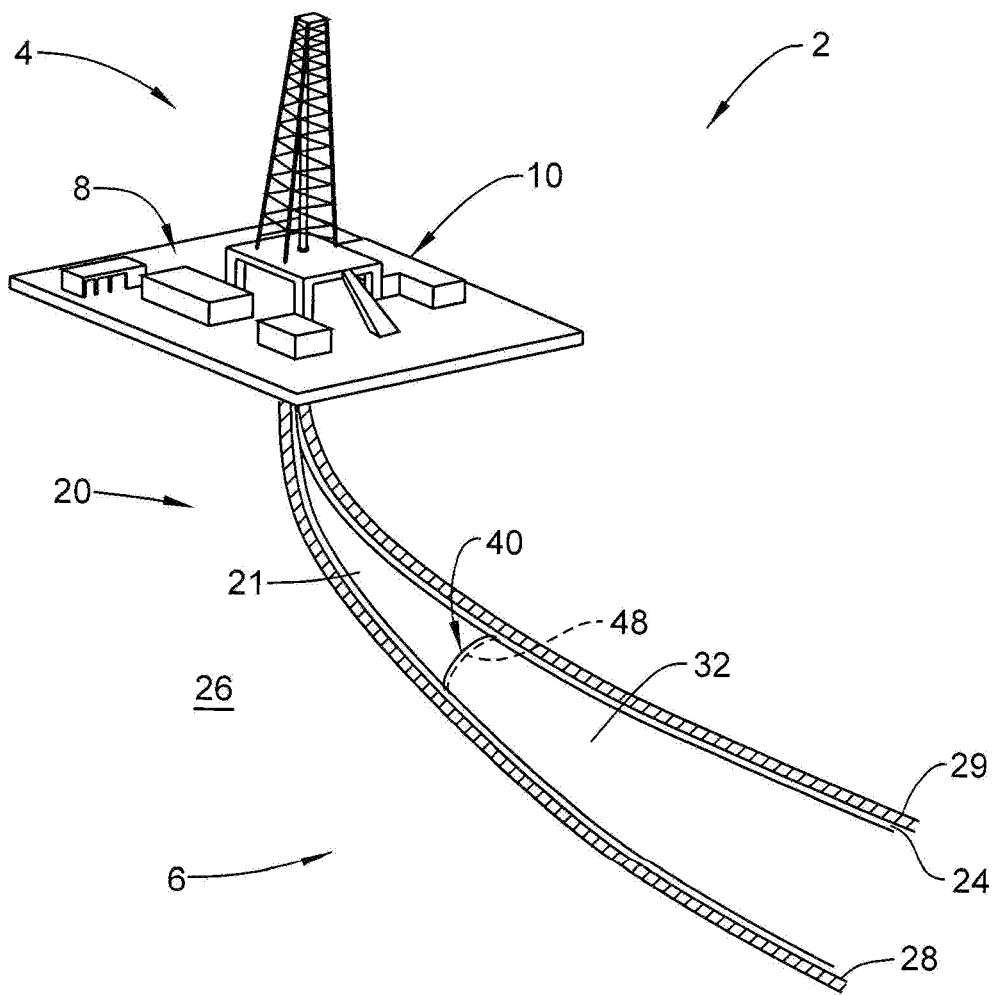
FIG. 1 depicts a resource recovery and exploration system including a tubular string having a corrosion protection element, in accordance with an exemplary embodiment.

A resource recovery and exploration system, in accordance with an exemplary embodiment, is indicated generally at 2, in FIG. 1. Resource exploration and recovery system 2 should be understood to include well drilling operations, resource extraction and recovery, $CO_2$ sequestration, and the like. Resource exploration and recovery system 2 may include a first system 4 which, in some environments, may be a surface system operatively connected to a second system 6 which, in some environments, may be a downhole system. First system 4 may include pumps 8 that aid in completion and/or extraction processes as well as fluid storage 10. Fluid storage 10 may contain a drilling fluid, a completion fluid or a stimulation fluid (not shown) or other fluid which may be introduced into second system 6.

Second system 6 may include a tubular string 20 formed from a plurality of tubular components, one of which is indicated at 21 that is extended into a wellbore 24 formed in formation 26. Wellbore 24 includes an annular wall 28 that may be defined by a wellbore casing 29 provided in wellbore 24. Of course, it is to be understood, that annular wall 28 may also be defined by formation 26. Tubular 21 is coupled to another tubular 32 at a connection joint 40. In accordance with an exemplary embodiment, a magnesium element 48 is arranged at connection joint 40. Magnesium element 48 may be subtractive or additively manufactured foil, a sheet, a ring, a wire, or combinations thereof. Magnesium element 48 may also be applied by cladding, cold spraying, or through other coating deposition methods. Magnesium element 48, as will be detailed herein, protects tubular 21 and another tubular 32 at connection joint 40 from corrosion resulting from exposure to a corrosive environment in wellbore 24. In an embodiment, tubular 21 and another tubular 32 may be formed from a metallic material such as steel, stainless steel, a nickel alloy, a copper alloy and/or a cobalt alloy.

Tubular string 20 may be exposed to fluids containing high levels of halide ions, oxygen hydrogen sulfide ($H_2S$), carbon dioxide ($CO_2$) and combinations thereof. These chemical species as well as other constituents in formation fluids may be corrosive to metallic materials in tubular string 20. Corrosiveness may also depend on a pH value of the formation fluid and downhole temperature. Elevating pH levels of wellbore fluids has been shown to reduce corrosiveness. However, current techniques for raising pH levels, such as introducing additives from surface system 4 are costly. Further, inherent latency introduced into measurement gathering due to environmental factors may expose certain areas of tubular string 20 to corrosive fluids. Magnesium element 48 creates a localized elevation in pH levels resulting from anodic dissolution of Magnesium that delivers additional cathodic protection to metallic surfaces at connection joint 40.

Figure 2:
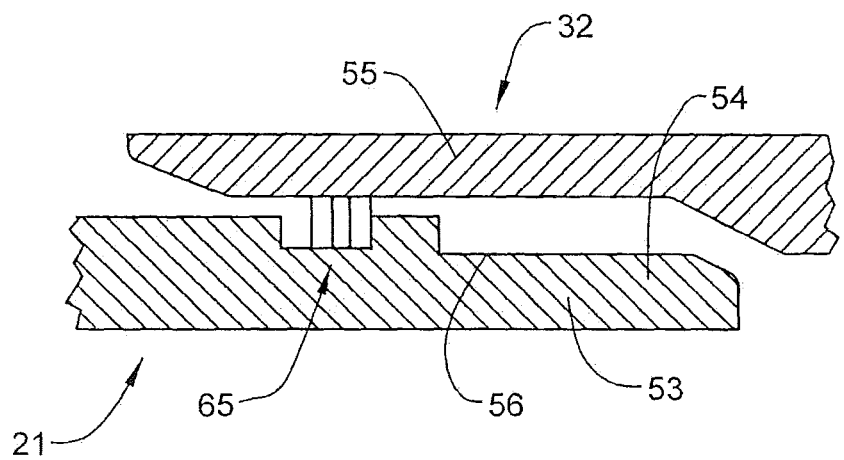
FIG. 2 depicts a connection joint in the tubular string of FIG. 1, in accordance with an exemplary embodiment.

As shown in FIG. 2, tubular 21 includes a first connector portion 53 having an outer surface 54 and another tubular 32 includes a second connector portion 55 having an inner surface 56 that are brought together to form connection joint 40. First connector portion 53 includes a reduced thickness as compared to an average thickness of tubular 21. That is, first connector portion 53 is radially thinner than other portions of tubular 21. Similarly, second connector portion 55 has a reduced thickness as compared to an average radial thickness of another tubular 32 shown in FIG. 3. A ring groove 61 is formed in outer surface 54 of tubular 21. Of course, it should be understood that ring groove 61 may, in the alternative, be formed in inner surface 56. Further, portions of ring groove 61 could also be formed in each of outer surface 54 and inner surface 56.

Figure 3:
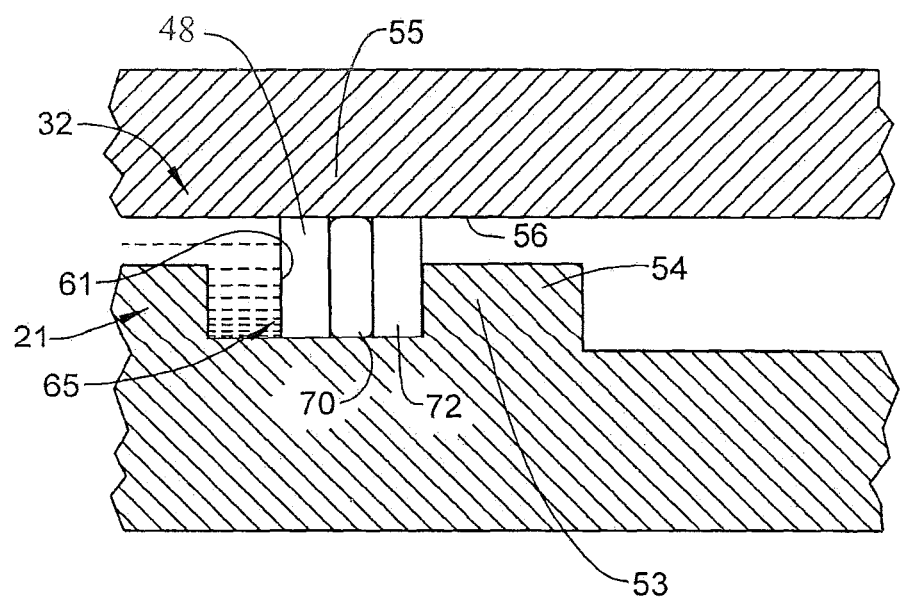
FIG. 3 depicts a magnesium element arranged at the connection joint of FIG. 2, in accordance with an aspect of an exemplary embodiment.

As shown in FIG. 3, a sealing system 65 is arranged in ring groove 61 that provides a barrier to fluids passing through connection joint 40. Sealing system 65 includes magnesium element 48, an O-ring 70, and a back-up ring 72.

In accordance with an exemplary aspect, magnesium element 48 is formed from magnesium and no more than about 10% by mass of one or more alloying elements. Thus, when exposed to corrosive fluids, electrons released from magnesium ring 68 due to anodic dissolution deliver cathodic protection to outer surface 54 and inner surface 56 thereby improving joint integrity. Further, as magnesium is very reactive, magnesium element 48 does not completely passivate at a pH value less than 13. Therefore, in accordance with an exemplary aspect, magnesium ring 68 establishes a selected pH zone at connection joint 40 having a pH value that is less than about 13. In accordance with another exemplary aspect, the selected pH zone has a pH value having a range that is between about 8 and about 12.

Figure 4:
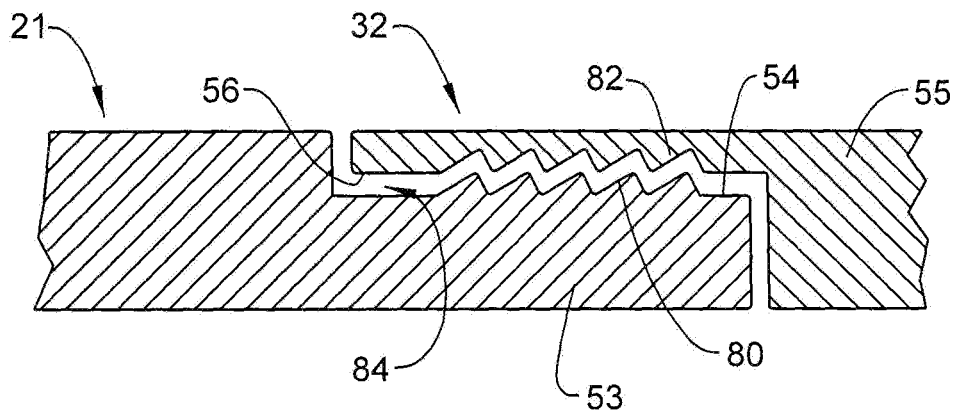
FIG. 4 depicts a threaded connection joint of the tubular string of FIG. 1, in accordance with another aspect of an exemplary embodiment.

Reference will now follow to FIG. 4, wherein like reference numbers represent corresponding parts in the respective views in describing another aspect of an exemplary embodiment. FIG. 4 depicts connection joint 40 as a threaded connection as opposed to the use of a sealing system. Outer surface 54 of first connector portion 53 includes a first plurality of threads 80 and inner surface 56 of second connector portion 55 includes a second plurality of threads 82. First plurality of threads 80 engage with second plurality of threads 82 to form connection joint 40. In the embodiment shown, an unthreaded portion of each of first connector portion 53 and second connector portion 55 forms a lead-in zone 84 that promotes coupling tubular 21 with another tubular 32 at surface system 4.

Figure 5:
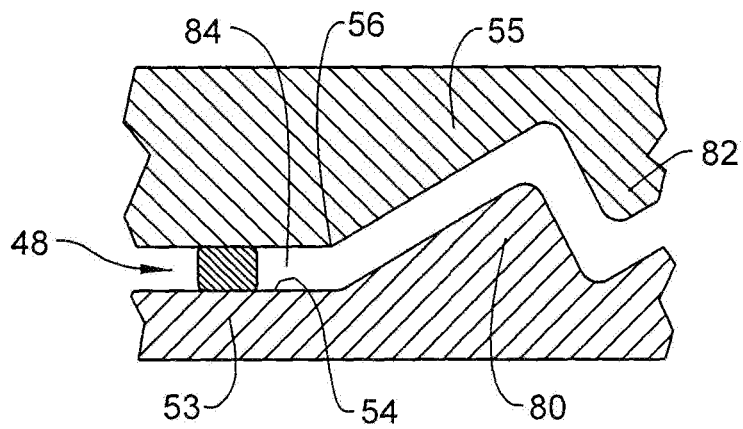
FIG. 5 depicts a magnesium element arranged at the connection joint of FIG. 4, in accordance with an aspect of an exemplary embodiment.
Figure 6:
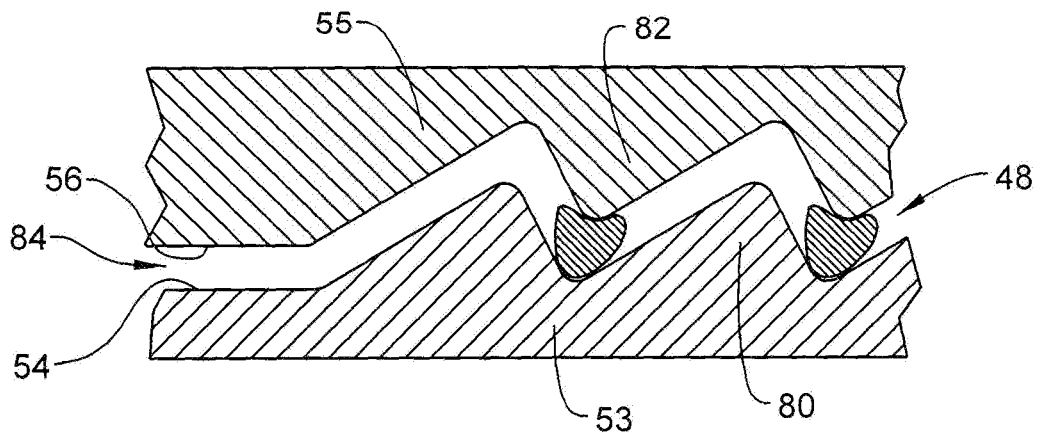
FIG. 6 depicts a magnesium element arranged at the connection joint of FIG. 4 in accordance with another aspect of an exemplary embodiment.

In accordance with an exemplary embodiment depicted in FIG. 5, magnesium element 48 may be formed from magnesium and no more than about 10% by mass of one or more alloying elements. Magnesium element 48 may be arranged in lead-in zone 84 or, as depicted in FIG. 6, between first plurality of threads 80 and second plurality of threads 82.

In a manner similar to that discussed above, when exposed to corrosive fluids, electrons released from magnesium element 48 due to anodic dissolution deliver cathodic protection to outer surface 54 and inner surface 56, thereby improving joint integrity. Further, as magnesium is very reactive, magnesium foil 88 does not completely passivate at pH levels less than 13. Therefore, in accordance with an exemplary aspect, magnesium foil 88 establishes a selected pH zone at connection joint 40 having a pH value that is less than about 13-pH. In accordance with another exemplary aspect, the selected pH zone includes a pH value that is between about 8 and about 12.

Set forth below are some embodiments of the foregoing disclosure:

Embodiment 1: A system for use in corrosive environments comprising a first tubular including a first connector portion, a second tubular including a second connector portion, the first connector portion overlapping the second connector portion to form a connection joint, and a magnesium element arranged between the first connector portion and the second connector portion at the connection joint.

Embodiment 2: The system according to any prior embodiment, wherein at least one of the first connector portion and the second connector portion includes a thickness that is less than a nominal thickness of corresponding ones of the first tubular and the second tubular.

Embodiment 3: The system according to any prior embodiment, wherein the magnesium element includes no more than about 10% by mass of one or more alloying elements.

Embodiment 4: The system according to any prior embodiment, wherein at least one of the first tubular and the second tubular includes a ring groove arranged at corresponding one of the first connector portion and the second connector portion.

Embodiment 5: The system according to any prior embodiment, wherein the magnesium element is positioned at the ring groove.

Embodiment 6: The system according to any prior embodiment, wherein the magnesium element forms a portion of a sealing system including an O-ring and a back-up ring arranged at the connection joint.

Embodiment 7: The system according to any prior embodiment, wherein the first connector portion includes a first plurality of threads and the second connector portion includes a second plurality of threads that engage with the first plurality of threads to form the connection joint.

Embodiment 8: The system according to any prior embodiment, wherein the magnesium element is arranged at the connection joint.

Embodiment 9: The system according to any prior embodiment, wherein the magnesium element is arranged between the first plurality of threads and the second plurality of threads.

Embodiment 10: The system according to any prior embodiment, wherein at least one of the first tubular and the second tubular is formed from a metallic material.

Embodiment 11: A method of protecting a connection from corrosive fluid comprising forming a connection joint between a first connector portion of a first tubular and a second connector portion of a second tubular, positioning a magnesium element at the connection joint, exposing the magnesium element to a corrosive fluid; and forming a selected pH zone at the connection joint by reacting the magnesium element and the corrosive fluid.

Embodiment 12: The method of any prior embodiment, wherein establishing the selected pH zone at the connection joint includes establishing a region having a pH value of between about 8 and about 12.

Embodiment 13: The method of any prior embodiment, wherein establishing the selected pH zone at the connection joint includes establishing a region having a pH value of between about 8 and about 12.

Embodiment 14: The method of any prior embodiment, wherein positioning the magnesium element includes arranging a magnesium foil between the first connector portion and the second connector portion.

Embodiment 15: The method of any prior embodiment, wherein positioning the magnesium element includes arranging the magnesium element between the first connector portion and the second connector portion.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, stimulation fluids, acids, steam, water, completion brines, corrosion inhibitors, oxygen scavengers, biocides, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system for use in corrosive environments comprising:
 a first tubular including a first connector portion;
 a second tubular including a second connector portion, the first connector portion overlapping the second connector portion to form a connection joint; and
 a magnesium element arranged between the first connector portion and the second connector portion at the connection joint, wherein the magnesium element forms a portion of a sealing system including the magnesium element, an O-ring and a back-up ring arranged at the connection joint.

2. The system according to claim 1, wherein at least one of the first connector portion and the second connector portion includes a thickness that is less than a nominal thickness of corresponding ones of the first tubular and the second tubular.

3. The system according to claim 1, wherein the magnesium element includes no more than about 10% by mass of one or more alloying elements.

4. The system according to claim 1, wherein at least one of the first tubular and the second tubular includes a ring groove arranged at corresponding one of the first connector portion and the second connector portion.

5. The system according to claim 4, wherein the magnesium element is positioned at the ring groove.

6. The system according to claim 1, wherein the first connector portion includes a first plurality of threads and the second connector portion includes a second plurality of threads that engage with the first plurality of threads to form the connection joint.

7. The system according to claim 6, wherein the magnesium element is arranged at the connection joint.

8. The system according to claim 7, wherein the magnesium element is arranged between the first plurality of threads and the second plurality of threads.

9. The system according to claim 1, wherein at least one of the first tubular and the second tubular is formed from a metallic material.

10. A method of protecting a connection from corrosive fluid comprising:
 forming a connection joint between a first connector portion of a first tubular and a second connector portion of a second tubular;
 positioning a magnesium element at the connection joint, the magnesium element defining a portion of a sealing system including the magnesium element, an O-ring, and a back-up ring;
 exposing the magnesium element to a corrosive fluid; and
 forming a selected pH zone at the connection joint by reacting the magnesium element and the corrosive fluid.

11. The method of claim 10, wherein forming the selected pH zone includes establishing a selected pH zone at the connection joint including a pH value of less than about 13.

12. The method of claim 11, wherein establishing the selected pH zone at the connection joint includes establishing a region having a pH value of between about 8 and about 12.

13. The method of claim 10, wherein positioning the magnesium element includes arranging a magnesium foil between the first connector portion and the second connector portion.

14. The method of claim 10, wherein positioning the magnesium element includes arranging the magnesium element between the first connector portion and the second connector portion.

* * * * *